United States Patent [19]

Cain et al.

[11] Patent Number: 5,061,126
[45] Date of Patent: Oct. 29, 1991

[54] HOLE SAW AND MANDREL ASSEMBLY

[75] Inventors: William Cain, Orange; Ernest Emond, Millers Falls; Karl Glawischnig, Shelburne Falls; Robert Grant, Athol, all of Mass.

[73] Assignee: Rule Industries, Burlington, Mass.

[21] Appl. No.: 532,527

[22] Filed: May 4, 1990

[51] Int. Cl.$^5$ .............................................. B23B 51/05
[52] U.S. Cl. ..................................... 408/206; 408/209
[58] Field of Search ............... 408/204, 206, 207, 209, 408/225

[56] References Cited

U.S. PATENT DOCUMENTS

| | | | |
|---|---|---|---|
| 2,852,967 | 9/1958 | Mueller et al. | 408/206 |
| 3,758,221 | 9/1973 | Meshulam | 408/204 |
| 3,999,869 | 12/1976 | Clark et al. | 408/204 |
| 4,077,737 | 3/1978 | Morse | 408/206 |
| 4,148,593 | 4/1979 | Clark | 408/206 |
| 4,303,357 | 12/1981 | Makar | 408/204 |

FOREIGN PATENT DOCUMENTS 2807198 8/1979 Fed. Rep. of Germany ...... 408/209

*Primary Examiner*—Daniel W. Howell
*Attorney, Agent, or Firm*—Fish & Richardson

[57] ABSTRACT

A one piece hole saw assembly with mandrel permanently affixed to the hole saw cup. The mandrel contains a hollow shaft, a locking flange and reinforcing flange which are integrally formed as by machining. The locking flange of the mandrel mates with a locking hole or slot in the top surface of the hole saw cup. The reinforcing flange on the mandrel is welded during manufacture to the top surface of the hole saw cup. A pilot drill bit is inserted into the shaft core and welded to the shaft. The resulting product is a one piece hole saw assembly intended for use by simple insertion of the mandrel or shaft end of the pilot drill into the chuck of a conventional electric drill.

13 Claims, 2 Drawing Sheets

HOLE SAW AND MANDREL ASSEMBLY

BACKGROUND OF THE INVENTION

1. Field of the Invention

The present invention relates to hole saws for power driven hole sawing operation. The present invention particularly relates to a hole saw wherein the hole saw and accompanying mandrel form a single integral unit.

2. Description of the Prior Art

Hole saws conventionally in use are formed of a cylindrical cutting blade which is separately attached to a mandrel or arbor just prior to use. The mandrel shaft is inserted into the jaws of the chuck of conventional electric power drills. Such electric drills are typically equipped with a "Jacobs" three jaw chuck.

In U.S. Pat. No. 3,999,869 a hole saws arbor construction is disclosed having a longitudinally grooved shank which telescopes into an enlarged body. The longitudinal grooves form engaging surfaces for the chuck jaws of conventional electric drills. A circular hole saw blade for cutting wood, plastic or metal is manually screwed to the base of the shank just prior to use of the hole saw. A drill bit, used to start the hole, is placed within the shank core and secured thereto by a set screw. The arbor construction disclosed in this reference is designed for use in relatively small drills, e.g. drills having ¼ inch to ½ inch capacity chucks.

In U.S. Pat. No. 4,148,593 a heavy duty arbor construction for hole saws is disclosed. As in U.S. Pat. No. 3,999,869 the base of the arbor is threaded so that a circular hole saw of desired diameter can be screwed to the arbor base just prior to use. The arbor, has a longitudinally grooved shaft inserted into an electric drill chuck and a quick disconnect drive collar which is slideably mounted on the shaft. After the hole saw of desired diameter is manually screwed onto the arbor base, the drive collar is manually slid down the shaft until drive pins attached to the underside of the collar engage receiving holes on the top surface of the hole saw. Engagement of the drive collar to the hole saw helps to transmit torque to the hole saw and lock up of the hole saw on the arbor during operation. The arbor design disclosed in this reference has the disadvantage that the arbor is expensive and hole saw blades must be manually attached to the arbor prior to use.

In U.S. Pat. No. 4,077,737 an integral hole saw and arbor construction is disclosed. The arbor is formed of a longitudinal shank telescoping into an intermediate drive plate which in turn telescopes into a circular end cap. The top of the end cap is permanently secured to the intermediate drive plate by a circumferential continuous tungsten inert gas (TIG) weld between the intermediate drive plate and the top surface of the end cap. (Col. 4, lines 54 to 58). The hole saw is permanently secured to the bottom of the end cap by a continuous circumferential TIG weld between the bottom of the end cap and the top surface of the cylindrical hole saw. (Col. 5, lines 3 to 9). These two welds provide the necessary strength for withstanding the high forces and stresses exerted during the hole sawing operation. (Col. 5, lines 6 to 9). A pilot drill bit is slid into the core of the arbor shaft prior to use. The drill bit is held firmly in place in the arbor shaft by a set screw which penetrates the shaft wall and connects with the drill bit. The set screw must be manually tightened.

The arbor constructions of the type disclosed in U.S. Pat. Nos. 3,999,869 and 4,148,593 have the advantage that they may be reused when the hole saw blade becomes worn. That is, the worn blade is removed from the arbor and another one secured thereto in its place. The arbor constructions, disclosed in these two references are heavy duty, permit high torque transmission and consequently allow sawing of even hard metals, e.g. metals which are not easily machined as well as soft thick metals, e.g. low carbon steel metals having thicknesses greater than 1/32 inch. The hole saw blade, however, must be separately mounted on the arbor before operation. The integral arbor construction disclosed in U.S. Pat. No. 4,077,737 has the disadvantage that two continuous welds, each at different points on the shaft, are required to complete the construction. This adds to the cost of manufacture. Also the design shown in this latter reference has the disadvantage that it requires the tightening of a set screw to hold the pilot drill in place prior to use.

Accordingly it is principal objective of the present invention to provide a one piece hole saw assembly which may be inserted into a conventional electric drill.

Another objective is to provide a hole saw assembly which is relatively inexpensive to manufacture but yet is strong enough to withstand the torsional stresses encountered during the sawing operation. A related objective is to provide a one piece hole saw assembly suitable for cutting holes in wood and metals which are easily machinable.

SUMMARY OF THE INVENTION

The hole saw assembly of the present invention is composed of a mandrel permanently affixed to a cylindrical hole saw cup. The assembly is a one piece unit and thus avoids the need to manually attach the mandrel to the hole saw prior to use. The hole saw assembly fits into chucks of conventional hand held electric drills. The mandrel is composed of a hollow shaft, a reinforcing flange and a locking flange all of which are preferably formed as an integral part of the mandrel, for example, by machining. The mandrel shaft proximally terminates at one end with the locking flange. The reinforcing flange is preferably located above the locking flange when the end of the shaft furthest from the locking flange is pointed upwards. The mandrel is affixed to the hole saw cup by inserting the locking flange into a mating locking hole or slot located in the top surface of the hole saw cup. The locking flange has at least one straight edge to prevent the mandrel from rotating in the locking hole. The reinforcing flange is welded to the top surface of the hole saw cup after the locking flange is inserted into the locking hole. A pilot drill bit is inserted into the shaft core so that the bit tip protrudes slightly from the cutting edge of the hole saw cup. Thereupon the bit is welded to the shaft.

The resulting product is a one piece hole saw assembly which is ready for use by insertion of the exposed end of the mandrel shaft or shaft end of the drill into a chuck of a conventional electric drill.

DETAILED DESCRIPTION

Figure 1:
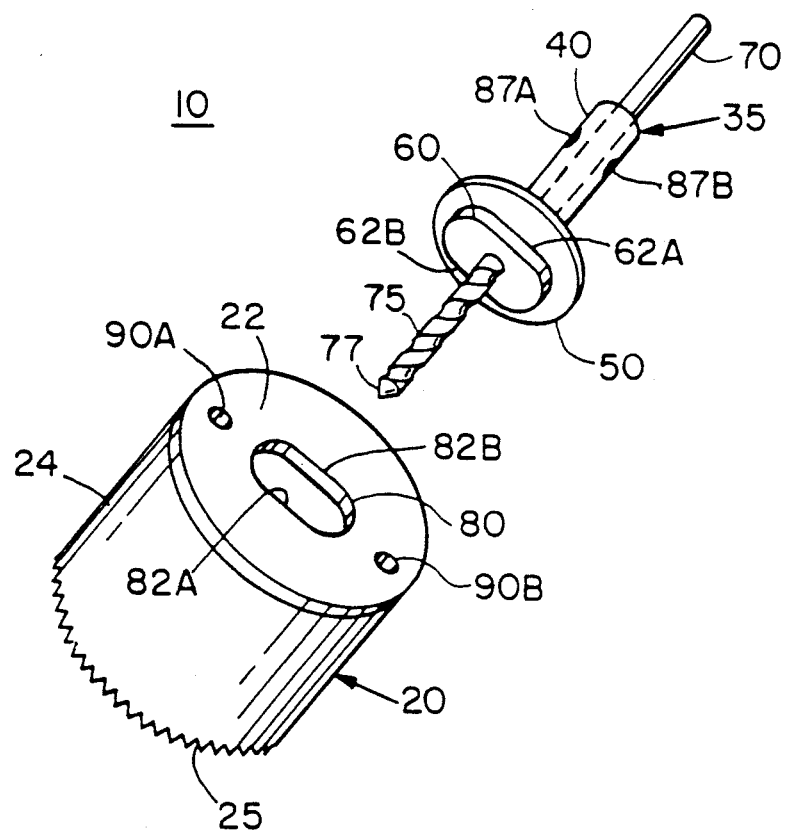
FIG. 1 is an exploded view of a preferred embodiment the hole saw assembly of the invention.
Figure 2:
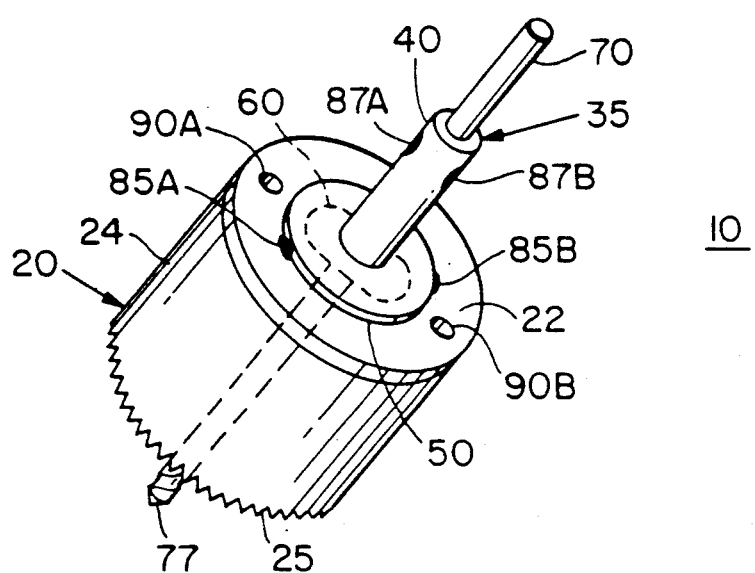
FIG. 2 is a pictorial view of the hole saw assembly.

The one piece hole saw assembly 10 of the invention is illustrated in a preferred embodiment shown in accompanying FIGS. 1 and 2. The hole saw assembly 10 is composed of a hole saw cup 20 and a mandrel 35. The mandrel 35 is formed of a hollow shaft 40, a reinforcing flange 50 and a locking flange 60. The reinforcing flange 50 is located preferably above locking flange 60 as illustrated in FIG. 1. Alternatively reinforcing flange 50 may be located below locking flange 60. Mandrel 35 is formed, for example, by machining so that shaft 40, locking flange 60, and reinforcing flange 50 are integrally formed from one piece without the use of welding. The reinforcing flange 50 may be of any desired shape but it is typically circular. Hole saw cup 20 is typically of cylindrical design. Hole saw cup 20 is preferably integrally formed from one piece construction formed of a single metal resulting in cup top surface 22, cylindrical side surface 24 and cutting teeth 25 running along the peripheral edge of the cup opposite top surface 22. Hole saw cup 20 is provided with a locking hole 80 preferably centrally located in the cup top surface 22. Locking hole 80 preferably has at least one straight or at least substantially straight edge, for example edge 82A. In the preferred embodiment shown in FIG. 1 locking hole 80 has a pair of oppositely facing straight edges 82A and 82B. In the preferred embodiment illustrated in FIGS. 1 and 2 locking hole 80 is of oblong shape having the aforementioned pair of oppositely facing straight edges 82A and 82B. This forms a very desirable "D" shape for locking hole 80. However, locking hole 80 may be of other shapes wherein at least one edge is straight, for example locking hole 80 may be of triangular, rectangular, pentagonal, hexagonal or higher order polygonal shape. Locking hole 80 could even be circular but as aforementioned it is preferable that at least one of its edges be straight. The expanse of straight edges, for example 82A and 82B should preferably be between 25 to 75 percent, typically about 50 percent of the total circumference of locking hole 80. Locking hole 80 penetrates at least substantially through cup surface 22 and preferably penetrates entirely through surface 22.

The locking flange 60 protrudes from the underside surface of reinforcing flange 50. Locking flange 60 is of proper size and shape that it will fit snugly into hole 80. Thus, locking flange 60 also preferably has at least one straight edge to mate with a like edge in hole 80. A very desirable shape for locking flange 60 and mating locking hole 80 is an oblong as aforementioned having two oppositely facing straight edges. One or more slug ejecting holes, for example holes 90A and 90B are optionally provided on the cup top surface. These holes allow easy removal of trapped material from the cup after use of the hole saw.

The hole saw assembly 10 is assembled during manufacture by inserting mandrel 35 into locking hole 80 so that locking flange 60 engages hole 80. Mandrel 35 thereupon rests snugly attached to hole saw cup 20. After inserting flange 60 into hole 80 the reinforcing flange 50 comes to rest flush against top surface 22 of cup 20. Thereupon reinforcing flange 50 is welded to surface 22 preferably by spot welding using an electric resistance spot welder. It is preferable to employ at least two spot welds, for example, welds 85A and 85B, preferably on oppositely facing edges of reinforcing flange 50. Once the mandrel is thus welded to the hole saw cup, the hole saw assembly can withstand normal torque associated with conventional hand held electric drills without any breakage or discernible distortion occurring in either cup 20, mandrel 35, locking flange 60 or in welds 85A and 85B. Reinforcing flange 50 thus functions to reinforce the lock between flange 60 and locking hole 80 and also functions to transmit positive torque from the mandrel to hole saw cup 20. The reinforcing flange 50 may be any desired shape but is typically circular having a diameter of between about 25% to 75% of the diameter of hole saw cup 20. Reinforcing flange 50 may typically be of heat treated low carbon steel or like material and preferably has a thickness of at least about the same thickness of cup 20. The locking hole 80 should have its smallest diameter between about 0.500 to 0.700 inches. Typically such diameter is about $\frac{1}{2}$ inch. Locking flange 60 may typically be of heat treated low carbon steel or like material and preferably has a thickness at least equal to or greater than the thickness of hole saw cup 20. To complete the assembly during manufacture a pilot drill bit 70 having conventional drill cutters 75 is inserted into hollow shaft 40 so that the tip 77 of bit 70 extends slightly beyond the cutting edge 25 of cup 20. Drill bit 70 is thereupon welded to shaft 40, preferably by applying at least one spot weld, more preferably at least two spot welds such as oppositely faced spot welds 87A and 87B. The spot welding is conveniently accomplished with an electric resistance welder.

The hole saw cup 20 including cutting teeth 25 are preferably of the same metal. A preferred metal for cup 20, for example, is AISI 1010 low carbon steel, typically of about 0.049 inches in thickness. While it is possible to employ different metals for cup 20 and cutting teeth 25, i.e. bimetallic fabrication, this would make cup 20 more expensive. It has been found unnecessary to employ such bimetallic fabrication for the services for which the hole saw of the invention is intended. It is desirable however to expose the hole saw cup 20 and integral cutters 25 to heat treating to harden the steel before use. If AISI 1010 low carbon steel is employed for cup 20, it is desirable to expose this material to heat treating in an enriched carbonitriding atmosphere for example at temperatures of about 1600° F. typically for one hour or as long as to achieve sufficient hardness. The resulting surface hardness of the heat treated hole saw cup 20 has been determined to be about a Rockwell hardness HRC of about 66 to 67.

The hole saw assembly 10 is intended for purchase by the user in a one piece form as shown in FIG. 2. That is, assembly 10 is intended to be assembled during manufacture in the manner aforedescribed or the equivalent thereof. An important advantage of the present invention therefore is that the user can insert the assembly directly into a conventional drill chuck by inserting shaft end 35 or shaft end of drill 70 into a standard Jacobs chuck, without need for any additional attachments. The hole saw cup can be made available in a variety of sizes for cutting of holes of different diameters, typically for hole sizes between 1⅜ to 2½ inches.

In operation the one piece hole saw of the present invention may be used advantageously for the cutting of holes in wood and light or soft metals for example aluminum, tin, copper, and brass. It may be used advantageously for the cutting of thin gaged soft metals for example thin gaged aluminum or thin gaged low carbon steels or thin low alloy metals. The one piece hole saw of the present invention has particular utility in cutting of easily machined metals having a thickness of 1/32 inch or less.

Although the present invention has been described with reference to a preferred embodiment it should be appreciated that variations are possible without departing from the scope of the invention. Accordingly the present invention is not intended to be limited by the specific embodiments but rather by the claims and equivalents thereof.

We claim:

1. A hole saw assembly comprising a hole saw cup and mandrel, said mandrel comprising a hollow shaft, a reinforcing flange and a locking flange, said shaft and said flanges integrally formed from one piece, said locking flange located proximally at one end of the shaft, the hole saw cup formed from one piece and having an open end and a substantially closed end surface opposite said open end, said open end having cutting teeth located along the peripheral edge thereof and said closed end surface having a locking hole at least substantially therethrough, said locking flange being engaged in the locking hole and said reinforcing flange being welded to said closed end surface of the hole saw cup.

2. A hole saw assembly as in claim 1 wherein the shaft includes a drill bit inserted therein and welded to said shaft so that it is permanently affixed thereto.

3. A hole saw assembly as in claim 2 wherein the drill bit is spot welded to the shaft and the reinforcing flange is spot welded to the closed end surface of the hole saw cup.

4. A hole saw assembly as in claim 1 wherein the locking hole has at least one substantially straight edge and the locking flange has at least one substantially straight edge.

5. A hole saw assembly as in claim 1 wherein the thickness of the locking flange is at least as great as the thickness of the locking hole.

6. A hole saw assembly as in claim 1 wherein the hole saw cup including the cutting teeth are formed of the same metal.

7. A hole saw assembly as in claim 6 wherein the metal is heat treated low carbon steel.

8. A hole saw assembly as in claim 3 wherein the spot welds are formed by electric resistance welding.

9. A hole assembly as in claim 1 wherein the locking hole penetrates through the entire closed end surface of the cup and said locking flange penetrates said closed end surface through said locking hole.

10. A hole saw assembly comprising a hole saw cup and mandrel, said mandrel comprising a hollow shaft, a reinforcing member and a locking member, said shaft and said reinforcing member and said locking member integrally formed from one piece, the hole saw cup integrally formed from one piece and having an open end and a substantially closed end surface opposite said open end, said open end having cutting teeth located along the peripheral edge thereof, and said closed end surface having a locking hole at least substantially therethrough, said locking member being engaged in the locking hole and said reinforcing member being welded directly to the closed end surface of the hole saw cup.

11. A hole saw assembly as in claim 10 wherein the shaft includes a drill bit inserted therein and welded to said shaft so that it is permanently affixed thereto.

12. A hole saw assembly comprising a hole saw cup and mandrel, said mandrel comprising a hollow shaft, a reinforcing member and a locking member, said shaft and said reinforcing member and said locking member integrally formed from one piece, the hole saw cup integrally formed from one piece and having an open end and a substantially closed end surface opposite said open end, said open end having cutting teeth located along the peripheral edge thereof, and said closed end surface having a locking hole at least substantially therethrough, said locking member being engaged in the locking hole and said reinforcing member being welded to the hole saw cup.

13. A hole saw assembly as in claim 12 wherein the shaft includes a drill bit inserted therein and welded to said shaft so that it is permanently affixed thereto.

* * * * *